June 25, 1940.   H. J. HORN   2,205,652
VEHICLE WHEEL
Filed June 26, 1937
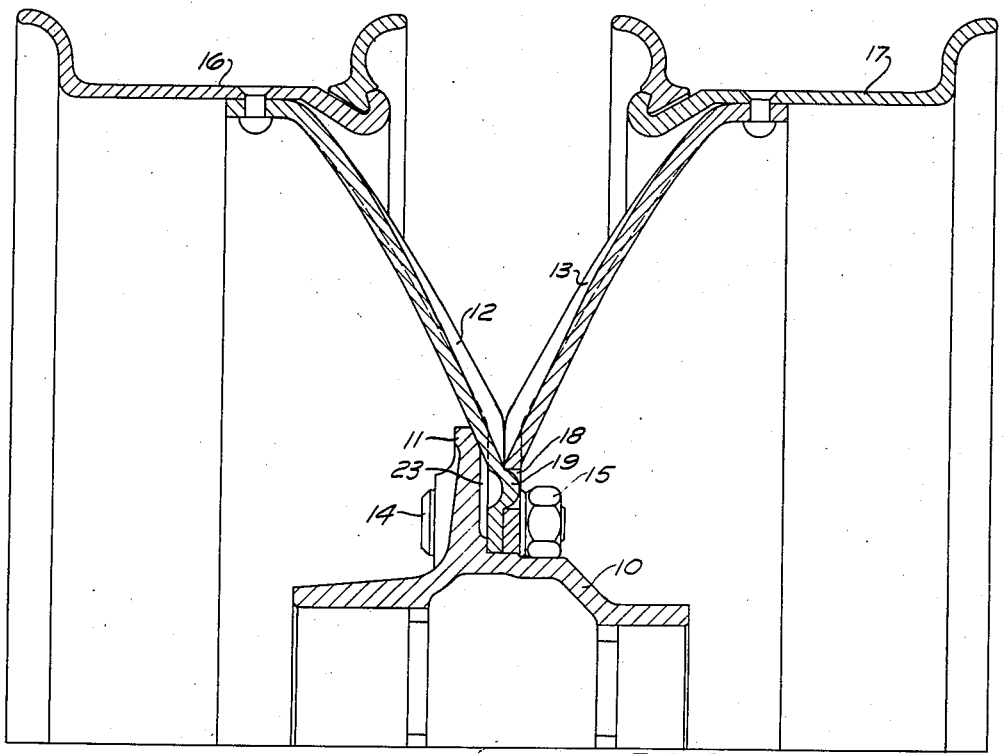
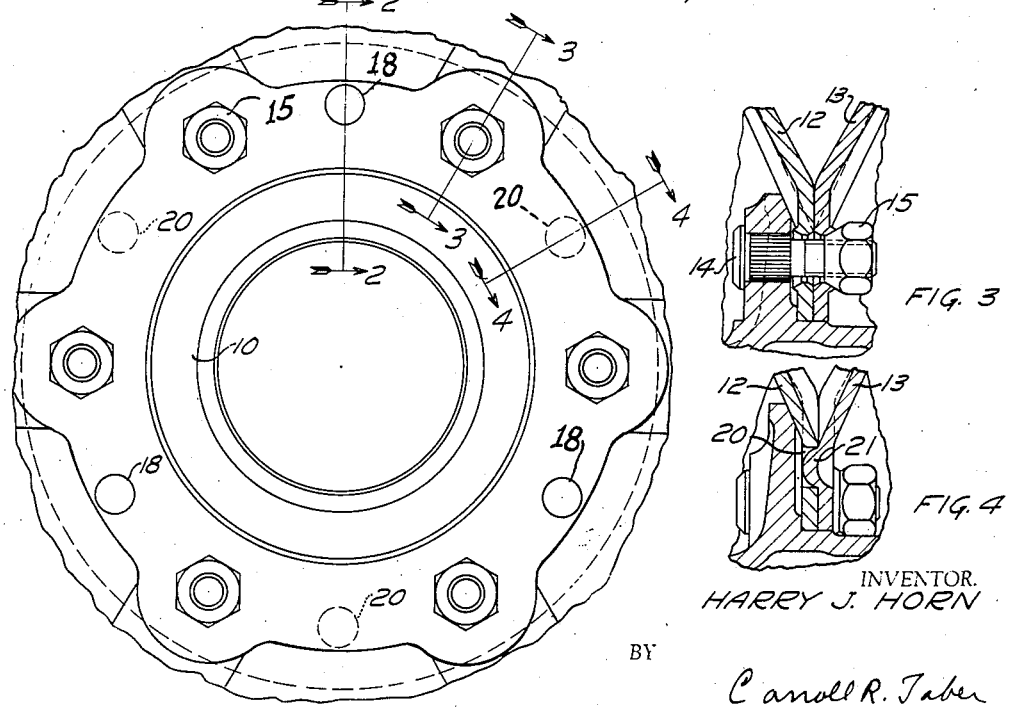
INVENTOR.
HARRY J. HORN
BY
Carroll R. Taber
ATTORNEY.

Patented June 25, 1940

2,205,652

UNITED STATES PATENT OFFICE 2,205,652

VEHICLE WHEEL

Harry J. Horn, Lansing, Mich., assignor to Motor Wheel Corporation, Lansing, Mich., a corporation of Michigan Application June 26, 1937, Serial No. 150,484

6 Claims. (Cl. 301—36)

This invention relates to vehicle wheels and more particularly to an improved wheel body construction for dual wheels.

An object of my invention is to provide means for securing the dual wheels to each other and to the hub in such a way that relative movement of the wheels is prevented.

Another object is to provide an improved means for mounting the wheels on the hub so that stud bolts may be used which are of lesser diameter than the openings in the wheel bodies through which they extend.

Other objects of the invention will appear in the following description and appended claims, reference being had to the accompanying drawing, wherein like numerals designate corresponding parts in the several views.

In the drawing:

Figure 1 is a front elevation of the central portion of a dual wheel construction embodying my invention;

Figure 2 is a partial section of a dual wheel construction taken on substantially line 2—2 of Figure 1;

Figure 3 is a sectional view of a portion of my improved wheel taken on line 3—3 of Figure 1; and Figure 4 is a sectional view taken on substantially line 4—4 of Figure 1.

The wheel shown in the accompanying drawing consists of a hub 10 which may be mounted on a vehicle axle in any approved manner. The hub has a generally radially extending flange 11 to which the wheel bodies 12 and 13 are secured by stud bolts 14 and nuts 15.

The wheel body 12 is provided in its central portion with a plurality of bosses 19 equally spaced on a circle extending about the center of the hub. Intermediate the bosses 19 are a plurality of holes 20, also equi-distantly spaced on the same circle as the bosses 19. The central portion of the wheel body 13 has a plurality of bosses 21 spaced in the same manner as the holes 20 in wheel bodies 12, and also has a plurality of holes 18 which mate with the bosses 19 on the wheel body 12.

Both wheel bodies 12 and 13 are drilled at equally spaced points on a circle about the center of the hub to receive the stud bolts 14. The wheel bodies are mounted on the stud bolts with the bosses 19 of wheel body 12 located in the holes 18 of wheel body 13 and with the bosses 21 of wheel body 13 located in the holes 20 of wheel body 12.

It will be noted that the stud bolts 14 are of a substantially smaller diameter than the diameter of the holes in the wheel bodies, and that the nuts 15 have frusto-conical portions which seat in the outer end of the holes in wheel body 13 to locate the wheel body 13 with respect to the hub. The nuts 15, when drawn up securely, clamp the wheel bodies 12 and 13 in position on the hub flange 11.

With this construction, it will be seen that the two wheel bodies 12 and 13 are located with respect to each other by the alternately oppositely extending bosses 19 and 21, which seat in the holes 18 and 20, respectively, and that the two wheels thus located are securely clamped in assembled relation by the stud bolts 14 and nuts 15.

While an equal number of bosses and holes have been shown in each wheel, it will be understood that the number of bosses may be less than the number of holes so long as they are arranged symmetrically about the wheel center. For example, six holes may be used and only two bosses. In that case, the two driver bosses will be located on the same circle as the holes and preferably arranged diametrically opposite each other. With this arangement, the dual wheels can be assembled in any one of six positions. In the specific construction herein shown and described, the dual wheels can of course be assembled in any one of three positions.

This construction does away with the use of stud bolts of the same size as the holes in the flanges of the dual wheels which have heretofore been considered necessary in order to prevent bending or breaking of the stud bolts due to relative rotation of the wheel bodies. In the present construction, the drive is applied to both wheel bodies through the friction between the hub flange 11 on the wheel body 12 and nuts 15 on wheel body 13.

It will, of course, be understood that the wheel 12 may be used singly, as the bosses 19 on that wheel do not in any way interfere with such use. The inner face of hub flange 11 is relieved at 23 so that there is no possibility of contact between the bosses and the flange itself.

The application of this invention to a wheel mounting is more economical than the conventional mounting, as there is no increase in cost of the wheels themselves and the cost of the stud bolts and nuts is less than the ones that are usually used. The scope of the invention is indicated in the appended claims.

I claim:

1. A dual wheel assembly comprising a hub having a radial flange, a pair of identical wheel bodies mounted on the hub, the adjacent faces of the central portions of the wheel bodies being coplanar to provide intimate contact therebetween throughout substantial areas, clamping means for clamping the wheel bodies together and to the hub, and means integral with the wheel bodies and located intermediate the clamping means for preventing relative movement of the wheel bodies in their own planes, whereby a driving force applied to one wheel body is transmitted to the other wheel body, said last named means lying wholly between the remote faces of the central portions of said wheel bodies.

2. A dual wheel assembly comprising a hub having a radial flange, a pair of identical wheel bodies mounted on the hub, the adjacent faces of the central portions of the wheel bodies being coplanar to provide intimate contact therebetween throughout substantial areas, clamping means for clamping the wheel bodies together and to the hub, and means on said wheel bodies for preventing relative movement of the wheel bodies in their own planes whereby a driving force applied to one wheel body is transmitted to the other wheel body, said last named means lying wholly between the remote faces of the central portions of said wheel bodies.

3. A dual wheel assembly comprising a hub having a radial flange, a pair of identical wheel bodies mounted on the hub, the adjacent faces of the central portions of the wheel bodies being coplanar to provide intimate contact therebetween throughout substantial areas, clamping means for clamping the wheel bodies together and to the hub, and means on said wheel bodies for preventing relative movement of the wheel bodies in their own planes whereby a driving force applied to one wheel body is transmitted to the other wheel body, said last named means lying wholly between the remote faces of the central portions of said wheel bodies and comprising a boss on one wheel body and a complementary recess in the other wheel body receiving said boss.

4. A dual wheel assembly comprising a hub having a radial flange, a pair of identical wheel bodies mounted on the hub, the adjacent faces of the central portions of the wheel bodies being coplanar to provide intimate contact therebetween throughout substantial areas, clamping means for clamping the wheel bodies together and to the hub, and means comprising bosses on the adjacent faces only of said wheel bodies and complementary recesses in said wheel bodies cooperating with said bosses for preventing relative movement of the wheel bodies in their own planes whereby the driving force applied to one wheel body is transmitted to the other wheel body, said last named means lying wholly between the remote faces of the central portions of said wheel bodies.

5. A dual wheel assembly comprising a hub having a radial flange, said flange having radially spaced annular wheel engaging surfaces at its axially outer side, a pair of identical wheel bodies mounted on the hub, the axially inner face of the inner wheel body engaging said hub flange only at said surfaces, the adjacent faces of the central portions of the wheel bodies being coplanar, means for clamping the wheel bodies together and to the hub, and means on said wheel bodies for preventing relative movement of the wheel bodies in their own planes whereby torque applied to one wheel body is transmitted to the other wheel body, said last named means lying wholly between the remote faces of the central portions of said wheel bodies.

6. A dual wheel assembly comprising a hub having a radial flange, a pair of identical wheel bodies having centrally located radial wheel flanges mounted on the hub, portions of the adjacent faces of said wheel flanges being coplanar throughout substantial areas, clamping means for clamping the wheel bodies together and to the hub, and means on said wheel bodies and located in said coplanar portions for preventing relative movement of the wheel bodies in their own planes whereby a driving force applied to one wheel body is transmitted to the other wheel body, said last named means lying wholly between the remote faces of said wheel flanges in the zones of said coplanar portions.

HARRY J. HORN.